United States Patent [19]

Morell

[11] Patent Number: 5,217,196
[45] Date of Patent: Jun. 8, 1993

[54] MIXING BOWL STABILIZER

[76] Inventor: Alice R. Morell, 86 Highland Ave., Struthers, Ohio 44471

[21] Appl. No.: 883,288

[22] Filed: May 14, 1992

[51] Int. Cl.$^5$ .............................................. A47F 5/00
[52] U.S. Cl. .................................. 248/314; 220/574; 220/629; 248/694
[58] Field of Search .............. 248/346, 346.1, 311.2, 248/310, 314, 315, 302, 175, 148, 153, 694; 220/629, 630, 632, 574

[56] References Cited

U.S. PATENT DOCUMENTS

| 166,346 | 8/1875 | Collier. | |
|---|---|---|---|
| 455,094 | 6/1891 | Brusco. | |
| 1,149,010 | 8/1915 | Wilson. | |
| 1,184,851 | 5/1916 | Haroutunian. | |
| 2,489,766 | 11/1949 | Ernestus et al. . | |
| 2,565,793 | 8/1951 | Weismantel | 220/632 X |
| 3,814,360 | 6/1974 | Samuelian, Sr. et al. | 248/311.2 X |
| 4,015,940 | 4/1977 | Conlon | 248/314 X |
| 5,143,247 | 9/1992 | Gavle | 220/630 |

FOREIGN PATENT DOCUMENTS 0697767  9/1953  United Kingdom ................ 248/302

Primary Examiner—Ramon O. Ramirez
Attorney, Agent, or Firm—Harpman & Harpman

[57] ABSTRACT

A bowl stabilizer device for use with mixing bowls or the like in food preparation wherein a round or semi-round bowl bottom is present. The bowl stabilizer resiliently engages a portion of the bowl base conforming to the bowl diameter and angular inclination of the bowl portion providing for resistance of co-planar movement with the resting surface. The bowl stabilizer has a contoured endless coil configuration for overlapping engagement with the bowl.

4 Claims, 1 Drawing Sheet

MIXING BOWL STABILIZER

BACKGROUND OF THE INVENTION

1. Technical Field

This device relates to container bases and stabilizing structures used to rest a contoured bottomed container in for upright stabilization position during use.

2. Description of Prior Art

Prior art devices of this type have relied on a variety of different structural shapes and forms to hold and stabilize a number of different container configurations, see for example U.S. Pat. Nos. 455,094, 166,346, 1,149,010, 1,184,851 and U.S. Pat. No. 2,489,766.

In U.S. Pat. No. 455,094 a supplemental base for graduate glasses is disclosed wherein a wire frame configuration having a circular base portion has a glass engagement section extending from oppositely disposed sides of said base and configured in a resilient contoured U-shaped planar pattern engaging the base of the graduate glass.

In U.S. Pat. No. 166,346 a wire dish stand is disclosed which shows a circular wire configuration with multiple arms radiating outwardly from a center position forming a plurality of arcuately spaced inverted U-configurations for engaging and holding dishes within.

U.S. Pat. No. 1,149,010 discloses a sterilizer used to hold multiple bottles within a container for high heat treatment. The multiple bottles are positioned and held in place by a spiral spring which extends vertically around the height of the bottle.

In U.S. Pat. No. 1,184,851, a dish holder is disclosed which shows, among other things, a multiple wire loop configuration adjacent the base of the device and a similar expanded overlapping loop configuration and extending around the perimeter edges of the base so as to support in a wire basket-like configuration a serving dish, etc.

Finally, in U.S. Pat. No. 2,489,766 a chime for barrels is disclosed in which a chime is shown having a saddle support to hold and support a rounded ended barrel. This support stabilizes and holds the barrel and prevents it from lateral movement and does so with a specific structural configuration of rigid support elements.

SUMMARY OF THE INVENTION

A bowl stabilizer device having a multiple resilient coil configuration which extends around and engages the lower portion of a mixing bowl and wedgeably secures it to the surface on which it sits preventing same from lateral movement. The bowl stabilizer device is expandable and can be overlapped upon itself so as to conform to a variety of bowl base portion diameters and can be collapsed and gathered together for easy storage.

DESCRIPTION OF THE PREFERRED EMBODIMENT

Figure 1:
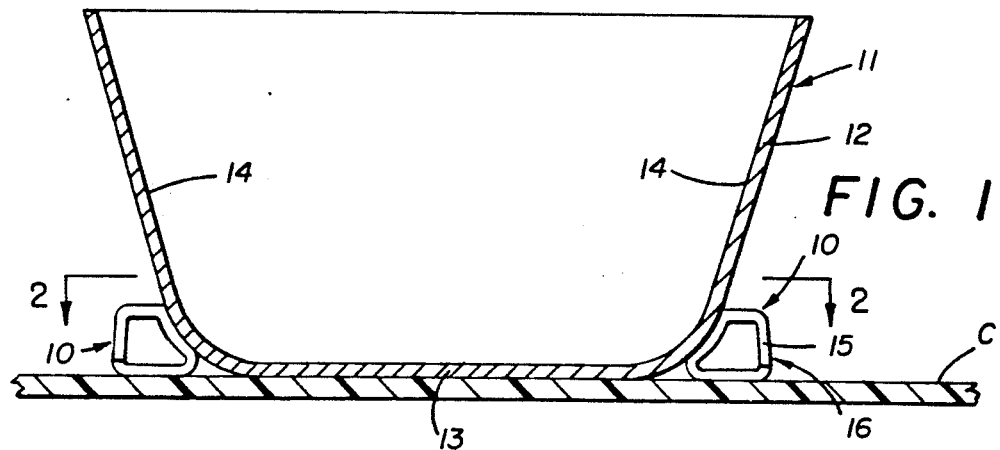
FIG. 1 is a cross-sectional view of the device positioned about a bowl on lines 1—1 of FIG. 2.
Figure 2:
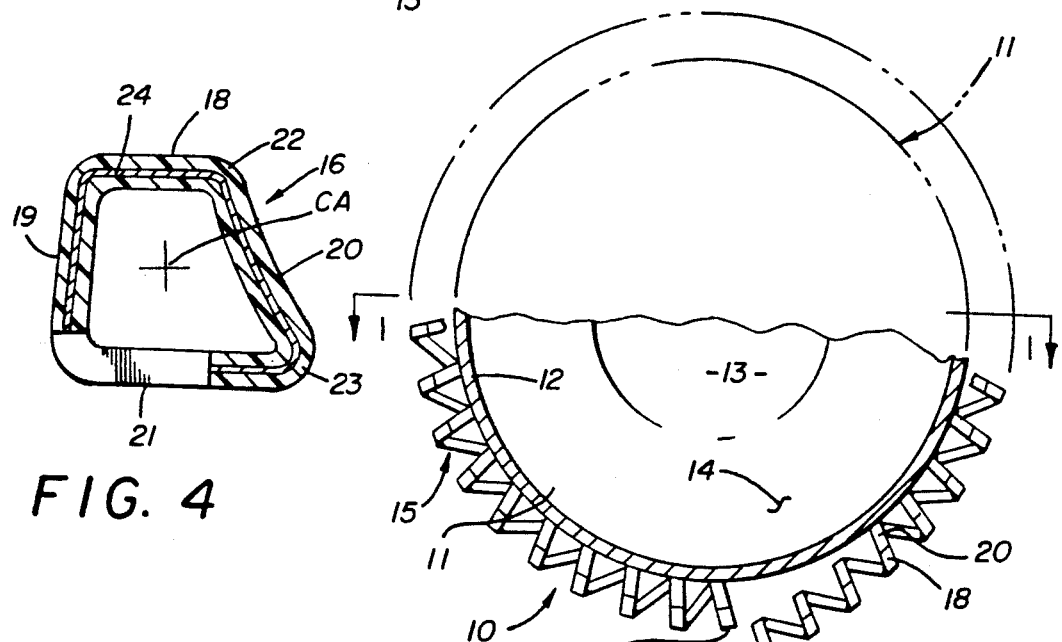
FIG. 2 is a partial section of the bowl on lines 2—2 of FIG. 1.

Referring to FIGS. 1 and 2 of the drawings, a bowl stabilizer 10 can be seen positioned about and engaged on a mixing bowl 11. The mixing bowl 11 has, in this example chosen for illustration, a continuous contoured side wall 12, and an integral bottom portion 13. The mixing bowl 11 is typically opened at its top opposite said bottom portion 13 with the contoured side wall 12 having an angular inclination generally at 14 and a modified fusto-conical shape, well known to those skilled within the art. It will be evident from the above description that various other similar bowl configurations can also be used.

Figure 3:
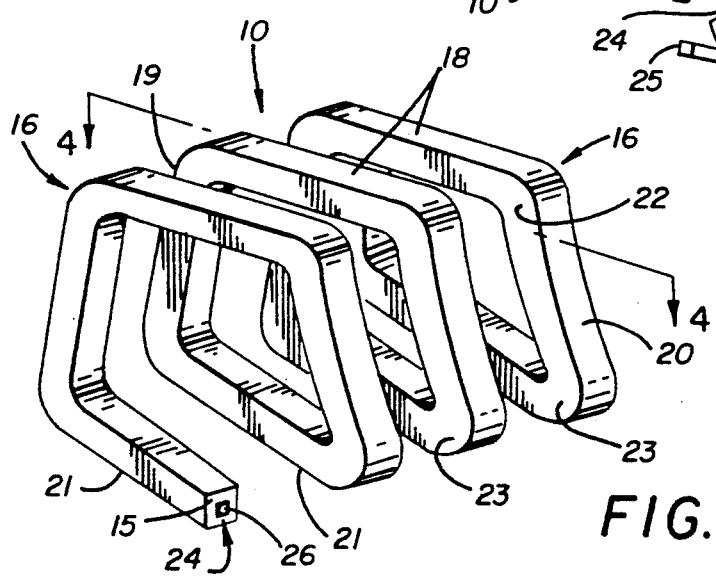
FIG. 3 is an enlarged portion showing the individual segments.

The bowl stabilizer 10 is characterized by a continuous elongated coiled cord configuration 15 in which multiple coil segments 16 are formed by said elongated coil cord 15 which is repeatedly configured in longitudinally spaced relation about a center coil axis, CA, best seen in FIGS. 2 and 3 of the drawings.

Figure 4:
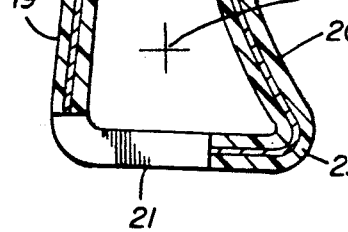
FIG. 4 is an enlarged cross-sectional view on lines 4—4 of FIG. 3.

The coiled cord 15 is cross-sectionally square and defines in its coiled configuration distinctive and identifiable pairs of respective surface areas 18, 19 and, 20, 21. The respective surface areas 18 and 21 are in vertical spaced relation to one another as best seen in FIGS. 3 and 4 of the drawings.

The surface area 21 defines a flat transversely wide ground engaging base for the bowl stabilizer 10. The surface 20 is angularly inclined between and integral with said respective surfaces 18-21 hereinbefore described. The intersection between the respective surface areas defines compound curves at 22 and 23 which are greater than 90 degrees at the curved area 22 and less than 90 degrees at the curved area 23. The remaining intersection between the surfaces 18 and 19 and 19 and 21 are both 90 degrees in relation to one another.

Referring now to FIGS. 1 and 2 of the drawings, the bowl stabilizer 10 can be seen positioned around the mixing bowl 11 resting on a flat counter C. The bowl stabilizer 10 has its angularly inclines surface area 20 engaging the mixing bowl 11 and the base surface area 21 engaging the counter C. The bowl stabilizer conforms to and extends completely around the mixing bowl 11 by overlapping itself at its respective free ends 24 and 25. Interengaging the coil segments 16 alternately as will be evident to those skilled within the art.

The bowl stabilizer 10 is made of resilient resin material with an interior wire core 26 which helps to maintain and hold the pre-formed coil shape hereinbefore described.

Since each of the multiple segments 16 is formed of a synthetic resin compound characterized by high flexibility and high frictional co-efficient surface, the segment 16 will accordingly "grip" abutting smooth non-porous surfaces such as glass and metal receptacles and high pressure laminates found in said counters C.

The relative "grip" of the bowl stabilizer 10 with the counter C and around the entire perimeter abutting surface of the mixing bowl 11 efficiently stabilizes the mixing bowl relative to the counter C and will prevent unwanted lateral slippage of the mixing bowl 11 on the counter C during use.

The blow stabilizer 10's resilient shaped coiled configuration will conform to and encircle about the mixing bowl 11 stabilizing same and can be easily removed, adjusted, and reapplied depending on bowl size and use as best seen in FIG. 2 of the drawings.

Having thus described my invention, it will be apparent to those skilled in the art that various changes and modifications may be made therein without departing from the spirit of the invention, therefore I claim:

1. A bowl stabilizer for mixing bowls comprises a continuous elongated coiled cord configuration having multiple interconnected coil segments, each of said coiled segments having multiple pairs of interconnected opposing surface areas of unequal length one of said pairs of interconnected surface areas are in horizontally disposed relation to said remaining pair of interconnected surface areas, at least one of said interconnecting surface areas of said remaining pair of interconnected surface areas has a vertical offset angular alignment to said opposing interconnected surface area within its pair, means for interengaging said coiled segments, said coiled cord configuration formed of synthetic resin material, means for defining a pre-coil shape to said coil cord, each of said interconnected coil segment surface areas have at least one compound curve intersection area of greater than 90 degrees to one another and at least one compound curved intersection at less than 90 degrees respectively.

2. The bowl stabilizer of claim 1 wherein said means for interengaging said coil segments comprises overlapping a portion of said elongated coiled cord upon itself inwardly from its free ends thereof.

3. The bowl stabilizer of claim 1 wherein said means defining a pre-coil shape to said coiled cord comprises a wire core within said coiled cord, said wire cord having a pre-formed shaped coiled configuration defining interconnected coil segments.

4. The bowl stabilizer of claim 1 wherein said one of said interconnecting surface areas of said remaining pair of interconnected opposing surface areas having said vertical offset angular alignment are resiliently engaged with a wall portion of said mixing bowl, vertically spaced in relation to a countertop.

* * * * *